United States Patent
Koo et al.

(10) Patent No.: US 8,045,792 B2
(45) Date of Patent: Oct. 25, 2011

(54) METHOD AND APPARATUS FOR CONTROLLING DYNAMIC DEPTH OF STEREO-VIEW OR MULTI-VIEW SEQUENCE IMAGES

(75) Inventors: Jae-phil Koo, Seoul (KR); Seon-deok Hwang, Jochiwon-eup (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1053 days.

(21) Appl. No.: 11/867,715

(22) Filed: Oct. 5, 2007

(65) Prior Publication Data

US 2008/0240549 A1  Oct. 2, 2008

(30) Foreign Application Priority Data

Mar. 29, 2007  (KR) .................. 10-2007-0031142

(51) Int. Cl.
*G06K 9/00* (2006.01)
*G06T 15/00* (2011.01)
(52) U.S. Cl. ...................................... 382/154
(58) Field of Classification Search ............ 382/154; 356/12–14; 359/462–477; 345/419
See application file for complete search history.

(56) References Cited

U.S. PATENT DOCUMENTS

| | | | |
|---|---|---|---|
| 6,125,198 A * | 9/2000 | Onda | 382/154 |
| 6,226,396 B1 * | 5/2001 | Marugame | 382/154 |
| 7,567,703 B2 * | 7/2009 | Jones et al. | 382/154 |
| 7,623,674 B2 * | 11/2009 | Nichani et al. | 382/103 |
| 2006/0210146 A1 * | 9/2006 | Gu | 382/154 |
| 2006/0215903 A1 * | 9/2006 | Nishiyama | 382/154 |
| 2007/0081716 A1 * | 4/2007 | Ha et al. | 382/154 |
| 2008/0112616 A1 * | 5/2008 | Koo et al. | 382/171 |
| 2008/0199070 A1 * | 8/2008 | Kim et al. | 382/154 |

* cited by examiner

*Primary Examiner* — Jon Chang
(74) *Attorney, Agent, or Firm* — Sughrue Mion, PLLC

(57) ABSTRACT

A method and an apparatus for controlling a dynamic depth of stereo-view or multi-view images. The method includes receiving stereo-view or multi-view images, generating a disparity histogram by estimating the disparity of two images corresponding to the received images and measuring the frequency of the estimated disparity, determining the disparity control amount of the stereo-view or multi-view images by convoluting the generated disparity histogram and a characteristic function, and rearranging stereo-view or multi-view input images by controlling parallax according to the control amount of parity.

25 Claims, 17 Drawing Sheets

(b)

FIG. 2C (RELATED ART)
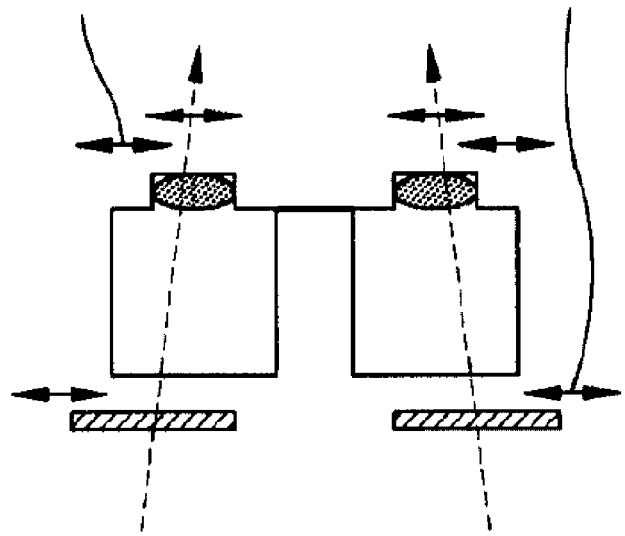
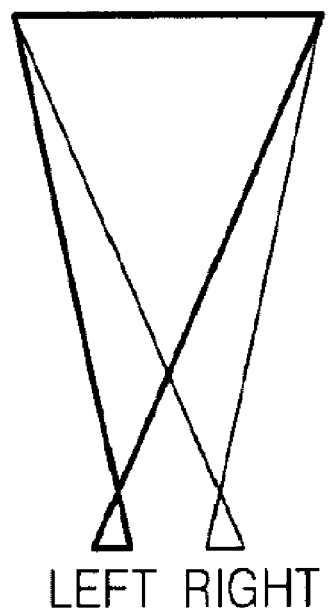
(c)

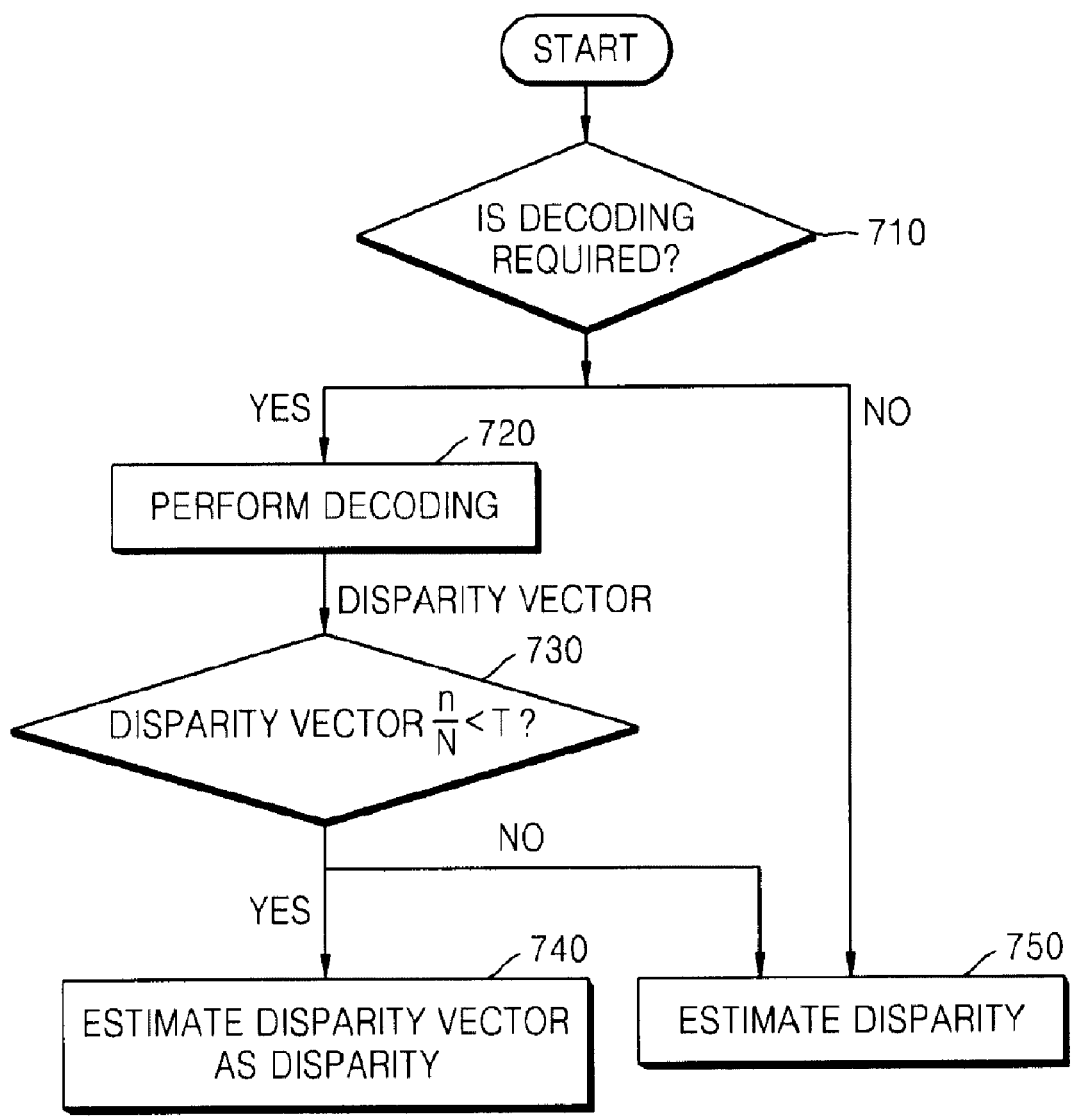

METHOD AND APPARATUS FOR CONTROLLING DYNAMIC DEPTH OF STEREO-VIEW OR MULTI-VIEW SEQUENCE IMAGES

CROSS-REFERENCE TO RELATED PATENT APPLICATION

This application claims priority from Korean Patent Application No. 10-2007-0031142, filed on Mar. 29, 2007, in the Korean Intellectual Property Office, the disclosure of which is incorporated herein in its entirety by reference.

BACKGROUND OF THE INVENTION

1. Field of the Invention

The present invention relates to controlling a dynamic depth of stereo-view or multi-view images, and more particularly, to controlling a dynamic depth in order to obtain optimum parallax in stereo-view or a multi-view images for a comfortable dynamic view.

2. Description of the Related Art

Images, captured by a stereo-view or multi-view camera in a parallel form, are input to stereoscopic display devices, and such images are used for a stereoscopic display. Displacement of an object, that is a disparity, exists between stereo-view images formed of two predetermined visual points. Due to such a disparity, a viewer feels positive or negative parallax, and thus feels a dynamic depth. However, when a viewer views images having parallax for a long time, the viewer may be easily fatigued and may have side effects, such as nausea.

FIG. 1 is a diagram for describing a related art method of generating stable stereo-view images by horizontally moving each of the stereo-view or multi-view images left and right.

According to the related art method, in order to obtain an image suitable for a three-dimensional (3D) image display from a stereo-view or multi-view image, a disparity of a stereo-view image received at each frame is obtained using a related art disparity estimation method, and then a disparity histogram is obtained. The disparity histogram is moved in a negative direction based on a threshold, in order to suitably apply a ratio of positive disparity and negative disparity to each frame. The disparity histogram is moved by cropping both ends of the stereo-view image.

FIG. 2 illustrates diagrams of types of stereoscopic cameras. In a communication environment of a stereo-view image, a stable stereo-view image causing low fatigue can be obtained by employing various camera structures in a camera tube by regulating the disparity of a receiving terminal as illustrated in FIG. 2, like the one obtained by controlling a convergence angle of a stereoscopic camera.

A related art method and apparatus for controlling a dynamic depth were developed considering characteristics of a corresponding stereo-view image by using a disparity histogram. However, a threshold value for controlling a disparity was obtained experimentally based on a subjective evaluation, not based on an objective basis. Also, in order to produce a stable stereo-view image that does not cause fatigue, parallax should be inside a suitable range, but the related art method and apparatus do not consider such a range.

Moreover, in the case of sequence images captured using a stereo-view or multi-view camera, the sequence images need to be efficiently compressed due to the massive amount of data. Decoding the massive amount of data and then parity estimating restored images in order to provide comfortable dynamic depth to a viewer are inefficient and difficult to realize in a system.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for controlling a dynamic depth which determine an optimum disparity control amount that can efficiently minimize side effects, such as eye fatigue, by processing a signal in a receiving terminal, while converting a stereo-view or multi-view image for a stereoscopic display. The method and apparatus use a disparity vector of each macroblock, the disparity vector extracted by decoding compressed stereo-view or multi-view stereo-view images according to an MPEG-2 multi-view profile (MVP) or multi-view video coding (MVC). Also, a method of controlling disparity, which analyzes a disparity histogram of the stereo-view images and uses a disparity histogram convolution sum technology in order to form the optimum stereoscopic visual field, is provided.

The present invention also provides a method and apparatus for controlling a dynamic depth by using a user interface which can set desired parallax, in terms of displaying rearranged stereo-view images.

According to an aspect of the present invention, there is provided a method of controlling a dynamic depth of stereo-view or multi-view images, the method including: receiving stereo-view or multi-view images; generating a disparity histogram by estimating a disparity of two images corresponding to the received images and measuring a frequency of the estimated disparity; determining a disparity control amount of the stereo-view or multi-view images by convoluting the generated disparity histogram and a characteristic function; and rearranging stereo-view or multi-view input images by controlling parallax according to the disparity control amount.

The generating of a disparity histogram may include determining whether the received images require a decoding process according to a compression and transmission technology, extracting a disparity vector after the decoding process, obtaining a ratio when a macroblock is in a skip mode, estimating disparity in a macroblock unit, and preparing a disparity histogram using the frequency of the estimated parity.

The determining of the disparity control amount may include selecting a characteristic function and determining the optimum disparity control amount via a convolution of the characteristic function and the disparity histogram, wherein parallax within ±7° is selected, a value obtained by converting parallax to a pixel unit is a range of the characteristic function, and the characteristic function is selected according to the type of received images.

The rearranging of the stereo-view or multi-view input images may include maintaining the stereo-view or multi-view images so as to have the same size of an input image or adjusting the stereo-view or multi-view images to a display form by cutting off the boundaries of each of the stereo-view or multi-view images by a value corresponding to half of the disparity control amount.

The method may further include performing moving average filtering in order to prevent a jitter phenomenon which may occur due to a drastic change of parity.

According to another aspect of the present invention, there is provided an apparatus for controlling a dynamic depth of stereo-view or multi-view images, the apparatus including: a receiver which receives stereo-view or multi-view images; a disparity estimator which generates a disparity histogram by estimating a disparity of two images corresponding to the received images and measuring a frequency of the estimated disparity; a disparity control amount determiner which determines a disparity control amount of the stereo-view or multi-view images by convoluting the generated disparity histogram and a characteristic function; and an image rearranger which rearranges stereo-view or multi-view input images by controlling parallax according to the control amount of parity.

The apparatus may further include a user interface which can control a dynamic depth by receiving the range of parallax or the disparity control amount via a user input signal.

The apparatus may further include a display which displays the rearranged images.

BRIEF DESCRIPTION OF THE DRAWINGS

The above and other aspects of the present invention will become more apparent by describing in detail exemplary embodiments thereof with reference to the attached drawings in which:

FIGS. 2A to 2C are diagrams illustrating different types of stereoscopic cameras;

FIG. 7 is a flowchart of a method of estimating disparity, which is performed in a disparity estimator according to an exemplary embodiment of the present invention;

DETAILED DESCRIPTION OF EXEMPLARY EMBODIMENTS THE INVENTION

Hereinafter, the present invention will be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those of ordinary skill in the art.

An important reason for visual fatigue while viewing a stereo-view image is a discord between a binocular convergence point and the focus of the pupil, i.e. parallax.

Figure 1:
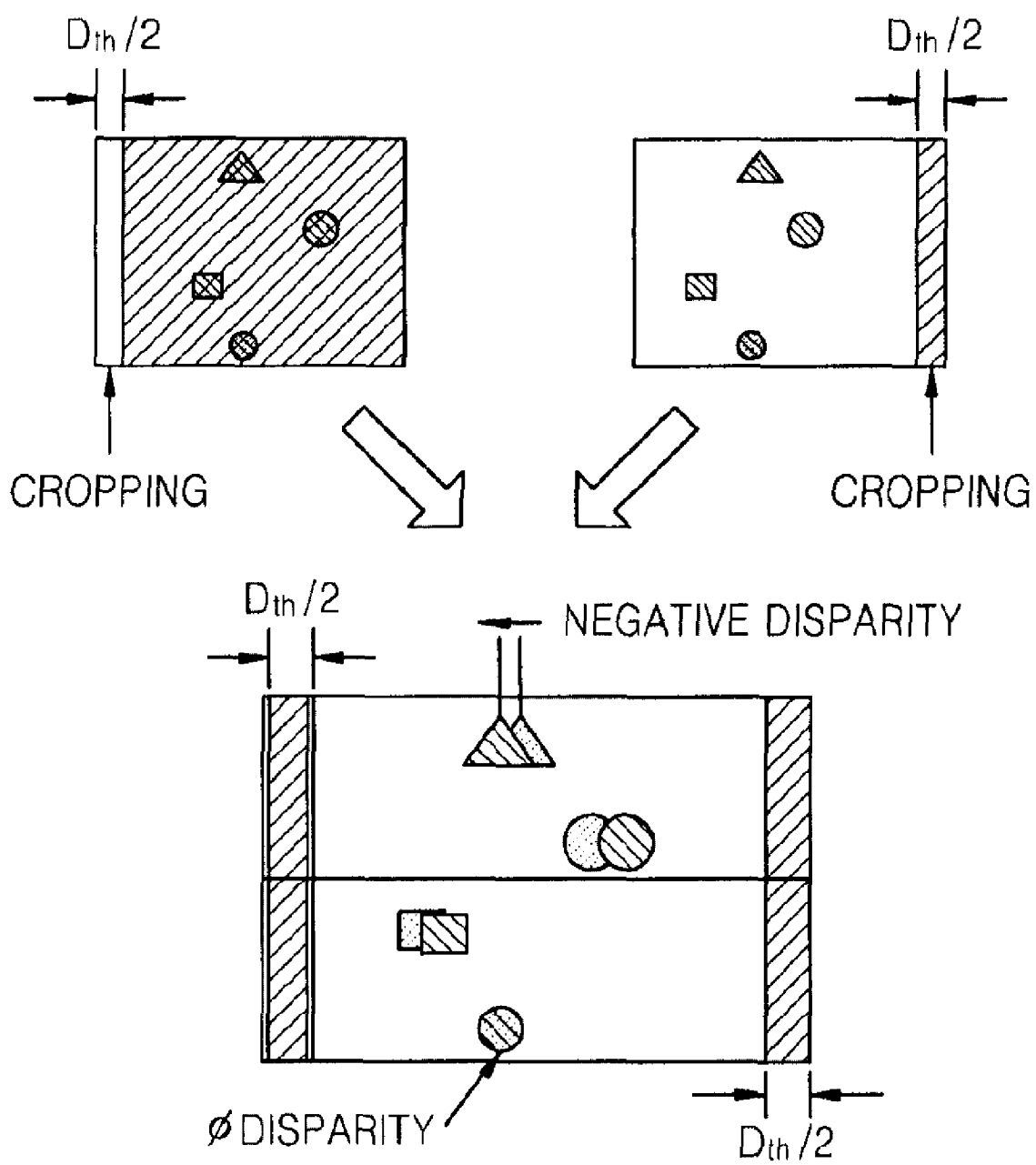
FIG. 1 is a diagram illustrating a related art method of generating stable stereo-view images by horizontally moving each of the stereo-view or multi-view images left and right.
Figure 2A:
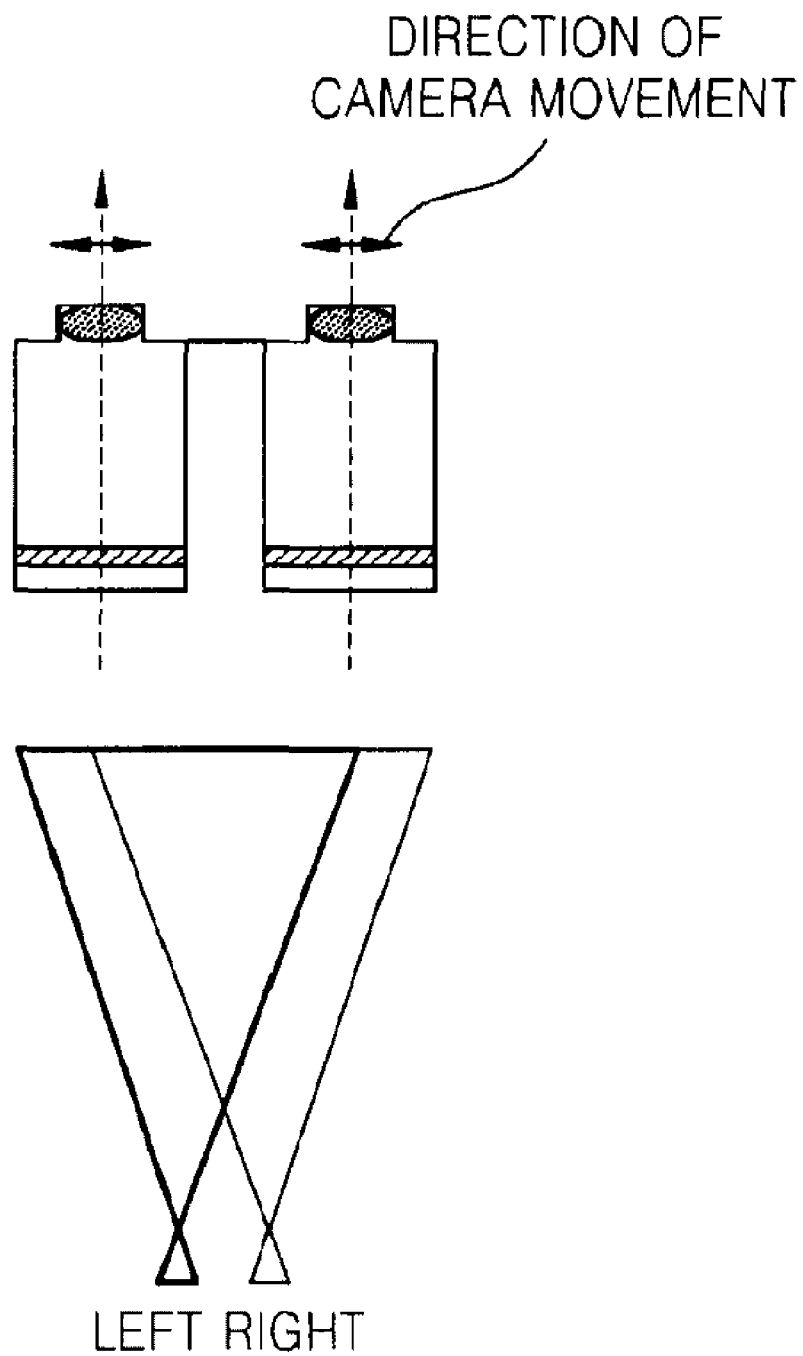
Figure 2B:
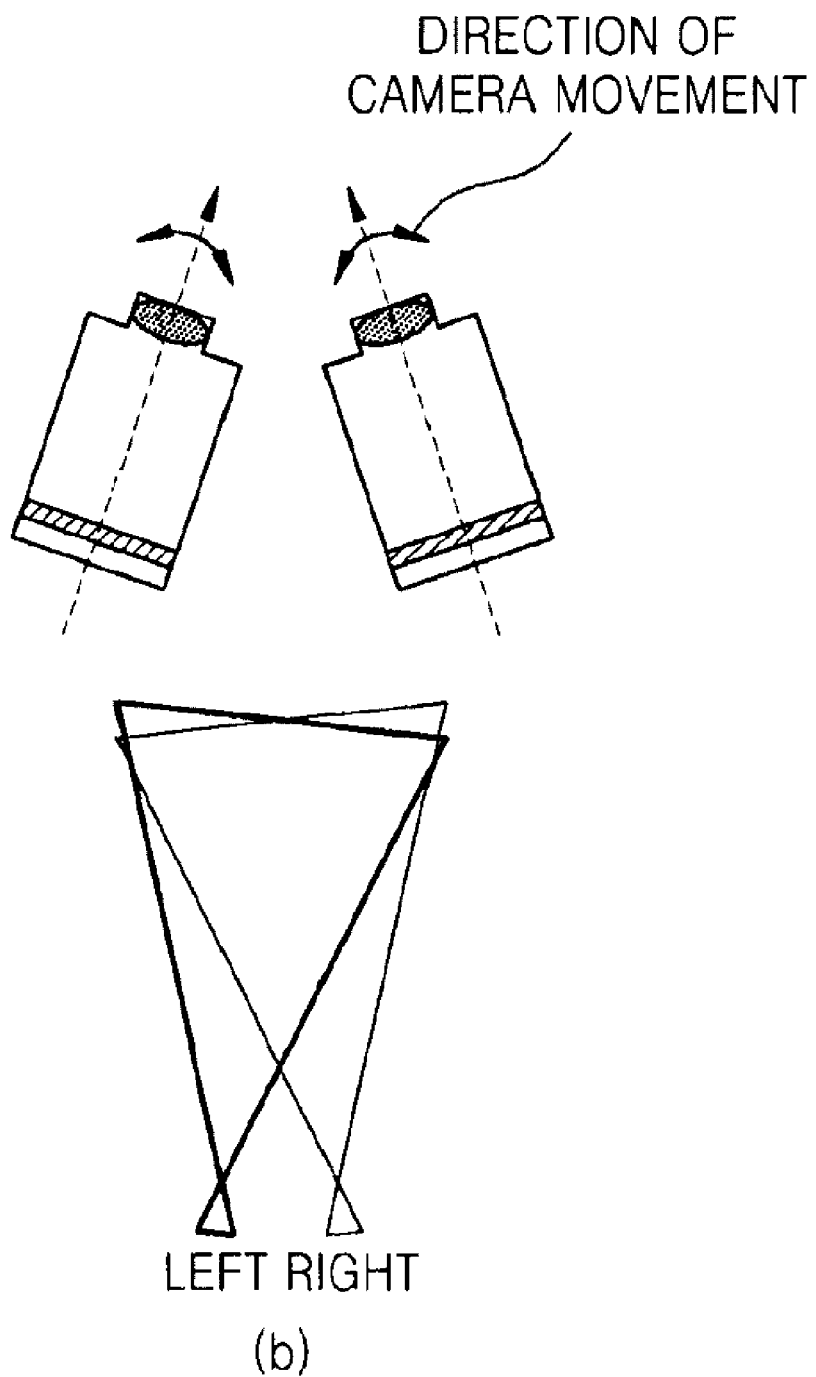

FIGS. 2A to 2C illustrate diagrams of types of stereoscopic cameras used in 3D display, which are currently being developed.

A structure illustrated in FIG. 2A is disposed in parallel, and thus does not have a convergence function like human eyes have.

A structure illustrated in FIG. 2B has a convergence function, but vertical parallax occurs at right and left ends of a stereo-view image. Distortion of the stereo-view image due to parallax is a reason for fatigue.

A structure illustrated in FIG. 2C is a hybrid stereoscopic camera. The hybrid stereoscopic camera counterbalances disadvantages of the structures illustrated in FIGS. 2A and 2B and leaves advantages. Accordingly, a convergence function can be controlled without vertical parallax.

In case of a multi-view camera, functions of the hybrid stereoscopic camera illustrated in FIGS. 2A to 2C cannot be realized. Multi-view video coding (MVC), which is currently being standardized, is a technology in which a transmitter effectively compresses and transmits a multi-view image and a receiver decodes the multi-view image. In MVC, even when the transmitter compresses and transmits the multi-view image, if a terminal of the receiver is a stereoscopic display, a function of selecting two predetermined views should be included. In this case, in order to display an image obtained by the multi-view camera as a stereoscopic display, that is, in order to display the image as an image obtained by the hybrid stereoscopic camera, a method of processing a signal is required.

Figure 3A:
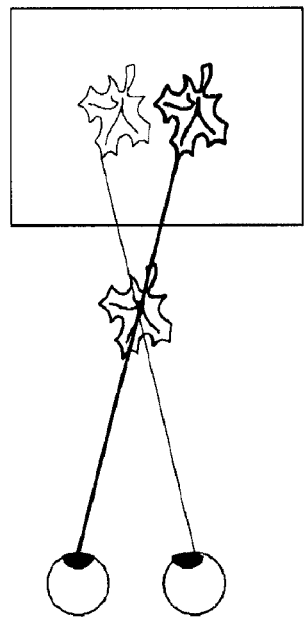
FIGS. 3A to 3C are diagrams illustrating different types of parallax.
Figure 3B:
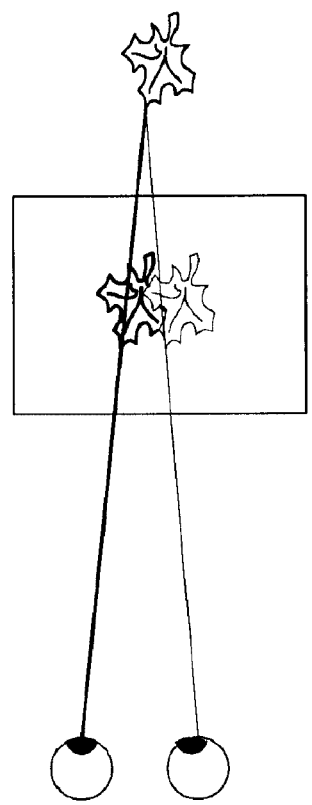
Figure 3C:
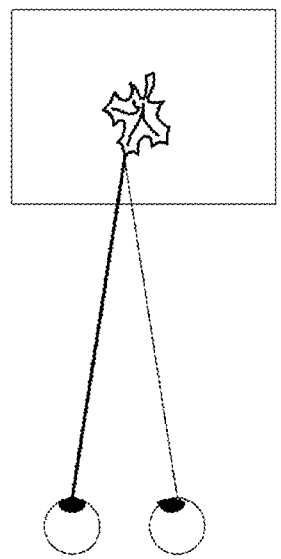

FIGS. 3A to 3C illustrate diagrams of types of parallax. Negative parallax illustrated in FIG. 3A is when an object seems to be projected from a screen, positive parallax illustrated in FIG. 3B is when an object seems to be inside a screen, and FIG. 3C is when an object seems to be at the same depth as a screen. In a stereo-view image, negative parallax has a larger 3D effect than positive parallax, but a viewer is more comfortable with positive parallax. However, when an object in the stereo-view image has excessive parallax to maximize the 3D effect, side effects arise, such as visual fatigue.

Figure 4:
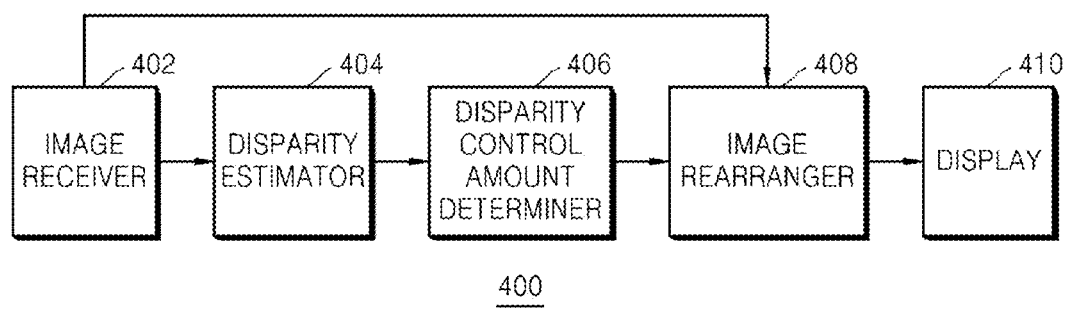
FIG. 4 is a block diagram of an apparatus for controlling a dynamic depth according to an exemplary embodiment of the present invention.

FIG. 4 is a block diagram of an apparatus 400 for controlling a dynamic depth according to an exemplary embodiment of the present invention.

The apparatus 400 includes an image receiver 402, a disparity estimator 404, a disparity control amount determiner 406, an image rearranger 408, and a display 410.

The image receiver 402 receives and outputs stereo-view or multi-view images to the disparity estimator 404 and the image rearranger 408, and a final image is displayed on the display 410.

The disparity estimator 404 estimates the disparity of two corresponding images from the stereo-view or multi-view images received from the image receiver 402, and generates a disparity histogram by measuring the frequency of estimated disparity.

Hereinafter, processes of estimating disparity and generating a disparity histogram by the disparity estimator 404 will be described with reference to FIGS. 5A through 9.

Figure 5A:
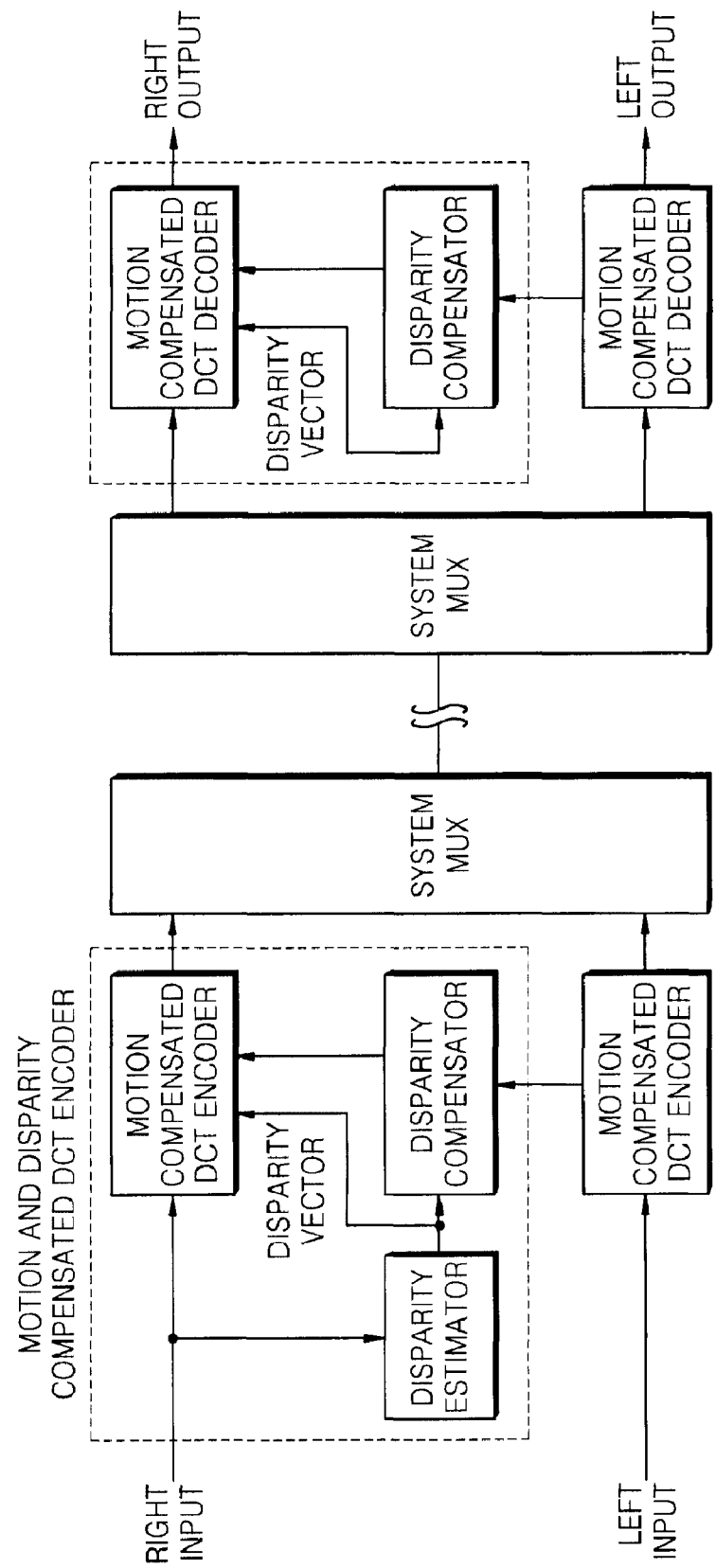
FIG. 5A is a block diagram of an encoder and decoder according to a MPEG-2 multi-view profile (MVP)

FIG. 5A is a block diagram of an encoder and decoder according to an MPEG-2 multi-view profile (MVP).

When stereo-view or multi-view image data is transmitted or stored in a multi media storage medium as illustrated in FIG. 5A, a standardized compression and transmission technology, such as MPEG-2 MVP or MVC, is used. Disparity is estimated for motion compensation, encoded, and transmitted in a macroblock unit, using the fact that correlation between each visual point is high while compressing a stereo-view or multi-view image.

Figure 5B:
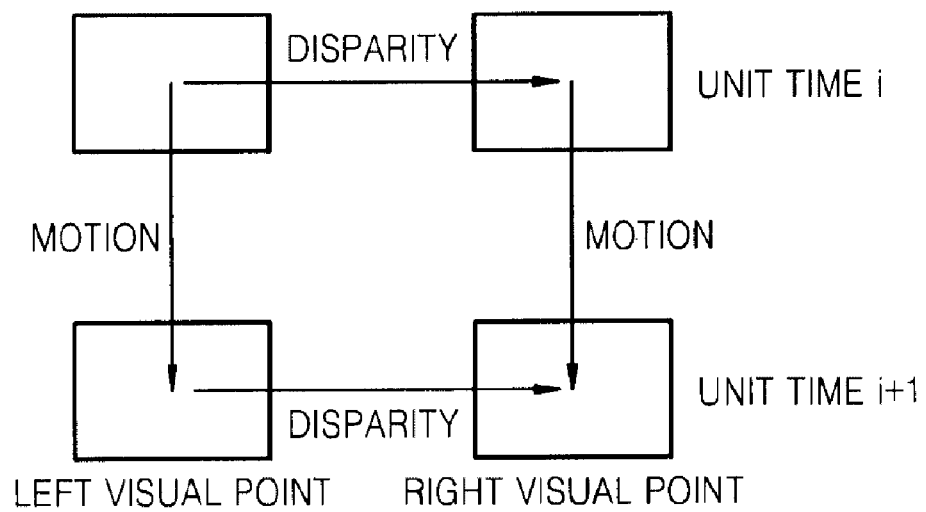
FIG. 5B is a diagram illustrating a process of extracting a disparity vector while estimating a motion and a disparity according to an MPEG-2 MVP.

FIG. 5B is a diagram for describing a process of extracting a disparity vector while estimating motion and disparity according to an MPEG-2 MVP.

FIG. 5B explains processes of predicting motion and disparity according to an MPEG-2 MVP, illustrating a disparity estimation technology as an example of a method of estimating disparity.

Figure 6:
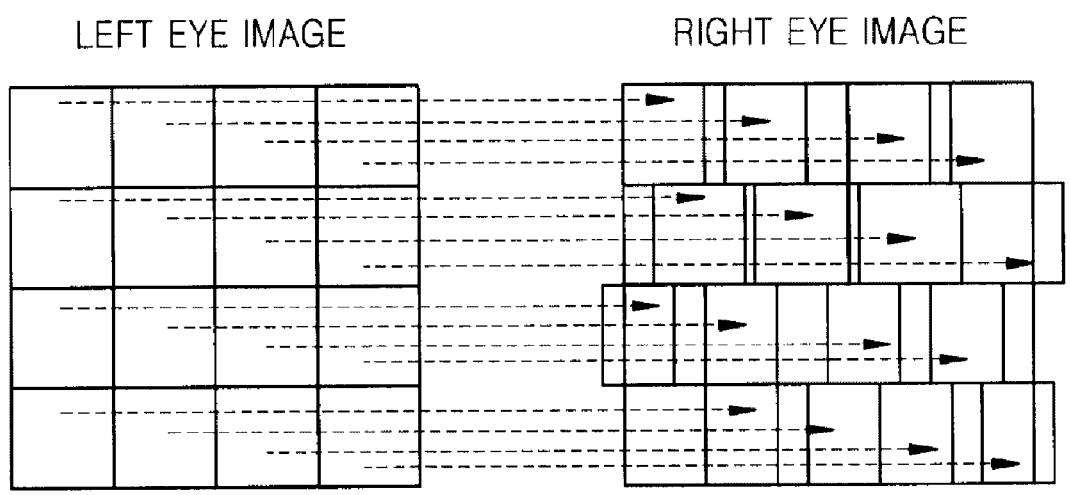
FIG. 6 is a diagram illustrating a related art method of estimating disparity based on a block.

FIG. 6 is a diagram for describing a related art method of estimating disparity based on a block, which is most frequently used from among disparity estimation technologies.

Referring to FIG. 6, a left eye image is divided into N×N uniform blocks, and a block most similar to each divided block is estimated in a right eye image using a sum of absolute differences (SAD) or a mean of absolute differences (MAD) method. Here, a distance between a reference block and an estimated block is defined as a disparity vector. Generally, a disparity vector may be separately given to all pixels in the reference image, but it is assumed that the pixels in one block are approximately the same in order to reduce the amount of calculations. This is the characteristic of the method of estimating disparity based on a block. When a disparity vector of each pixel is estimated by minutely estimating the disparity vector to a pixel unit, this is referred to as the method of estimating disparity based on a pixel.

In the present invention, in order to increase efficiency of a system, compressed and transmitted stereo-view or multi-view image data is decoded, a disparity vector is extracted in a macroblock unit, and a disparity histogram is prepared. During this process, when the disparity vector is estimated and encoded in order to increase compression efficiency, most macroblocks are encoded in a skip mode, and thus the disparity vector becomes 0. Accordingly, the number of disparity vectors extracted using the method of estimating disparity based on a block may be less than a threshold value in comparison to the number of entire marcoblocks. In this case or when stereo-view or multi-view image data is not compressed, disparity vectors are extracted using the method of estimating disparity in a marcoblock unit, and a disparity histogram is prepared using the extracted disparity vectors. This process will be described in more detail with reference to FIG. 7. Disparity required in determining a disparity control amount is estimated using the disparity vectors extracted through above process.

FIG. 7 is a flowchart of a method of estimating disparity, which is performed in a disparity estimator according to an exemplary embodiment of the present invention.

In FIG. 7, a method of extracting a disparity vector in a macroblock unit, which is performed in the disparity estimator 404 illustrated in FIG. 4 according to an exemplary embodiment of the present invention, is shown.

In operation 710, it is determined whether a received image is a compressed and transmitted image, and thus needs to be decoded. When it is determined that the received image needs to be decoded, operation 720 is performed. However, when the received image is not a compressed and transmitted image, operation 750 is performed.

In operation 720, the received image is decoded.

In operation 730, a disparity vector extracted via decoding is compared to a threshold value T in comparison to the number N of entire macroblocks of a current block processed by the number n of macroblocks in a skip mode. When $$\frac{n}{N} < T,$$

operation 740 is performed, but when $$\frac{n}{N}$$

is not smaller than T, operation 750 is performed. Here, the threshold value T is determined as an experimental value.

In operation 740, the extracted disparity vector is estimated as the disparity for obtaining a disparity vector.

In operation 750, the disparity is directly estimated based on a block since there is no extracted disparity vector.

Figure 8A:
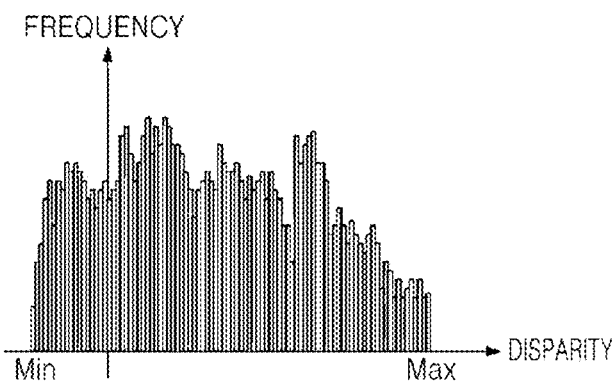
FIGS. 8A to 8C are diagrams illustrating disparity histogram of stereo-view or multi-view images and a fusion limit.
Figure 8B:
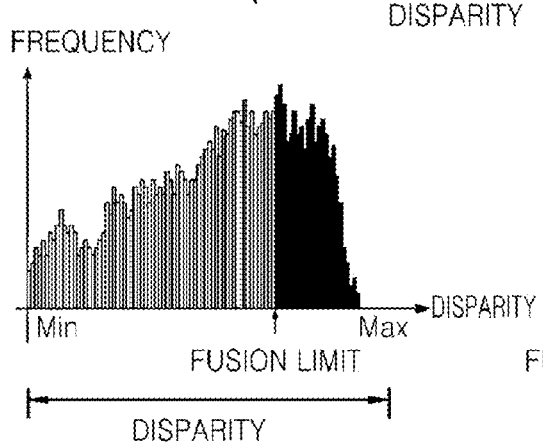
Figure 8C:
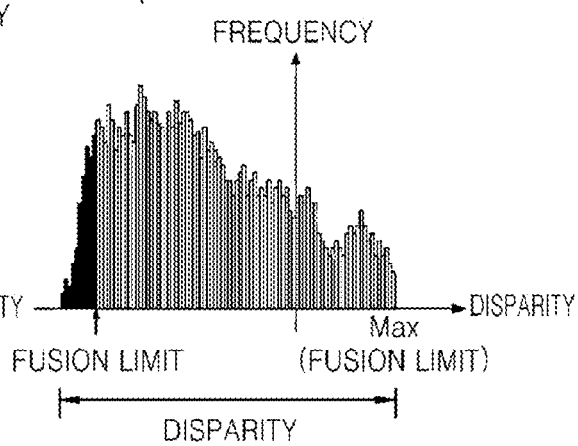

FIGS. 8A to 8C illustrate diagrams of a disparity histogram of stereo-view or multi-view images and a fusion limit.

FIG. 8A is a diagram illustrating a disparity histogram prepared using frequency of estimated disparity. Here, the estimated disparity is a horizontal component of a disparity vector. Since a dynamic depth is mainly affected by horizontal parallax rather than vertical parallax, the present invention does not consider a vertical component of a disparity vector. When a stereo-view image having parallax is viewed for a long time, a 3D effect is expected with side effects, such as eye fatigue. Accordingly, effects of a stereo-view image on both eyes should be analyzed via the disparity histogram.

FIGS. 8B and 8C are diagrams illustrating disparity parts inside a fusion limit of both eyes in a disparity histogram. It is known to developers of the related field that the maximum fusion range is within ±7° parallax, a range for reasonable viewing is within ±2° parallax, and a range for comfortable viewing is within ±1° parallax. Such an optimum range of parallax may differ according to individual differences, display characteristics, viewing distances, and contents, but the present invention follows the above ranges. In FIGS. 8B and 8C, light parts are areas inside the fusion limit, and dark parts are areas outside the fusion limit. Accordingly, the dark parts may cause side effects, such as eye fatigue.

Figure 9A:
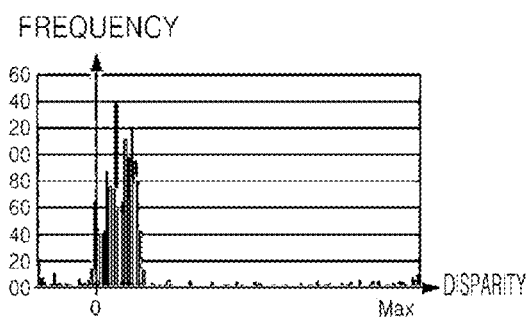
FIGS. 9A and 9B are diagrams illustrating disparity histograms of related art stereo-view or multi-view images.
Figure 9B:
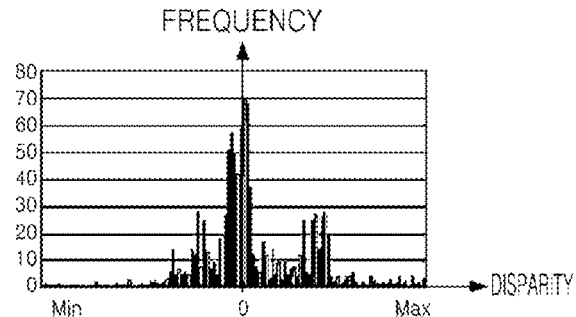

FIGS. 9A and 9B illustrate diagrams of disparity histograms of related art stereo-view or multi-view images.

FIG. 9A illustrates a disparity histogram of a stereo-view image formed of a background and FIG. 9B illustrates a disparity histogram of a stereo-view image formed of a foreground or an object. In the case of the stereo-view image formed of a background, the disparity histogram is biased towards a positive direction due to negative parallax, whereas in the case of the stereo-view image formed of a foreground or an object, the disparity histogram is relatively biased towards a positive direction since the foreground or the object protrudes compared to a background.

For a comfortable dynamic depth while viewing stereoscopic content, a concerned object or part of a foreground should have negative parallax and an unconcerned background should have positive parallax. If this is not the case, a viewer may feel fatigue due to an excessive dynamic depth or the entire dynamic depth may decrease. Accordingly in the present invention, an input stereo-view image is changed to a stereo-view image that is stable to both eyes by analyzing disparity histograms of various stereo-view images as illustrated in FIGS. 9A and 9B.

Referring back to FIG. 4, the disparity control amount determiner 406 determines a disparity control amount for providing a comfortable dynamic depth to a viewer, by convoluting a disparity histogram, prepared by the disparity estimator 404, and a characteristic function. Here, the characteristic function denotes a characteristic function of the disparity control amount determiner 406 which will convolute the disparity histogram in order to obtain the optimum disparity control amount. Operations of the disparity control amount determiner 406 will now be described in detail with reference to FIGS. 10 through 12.

Figure 10:
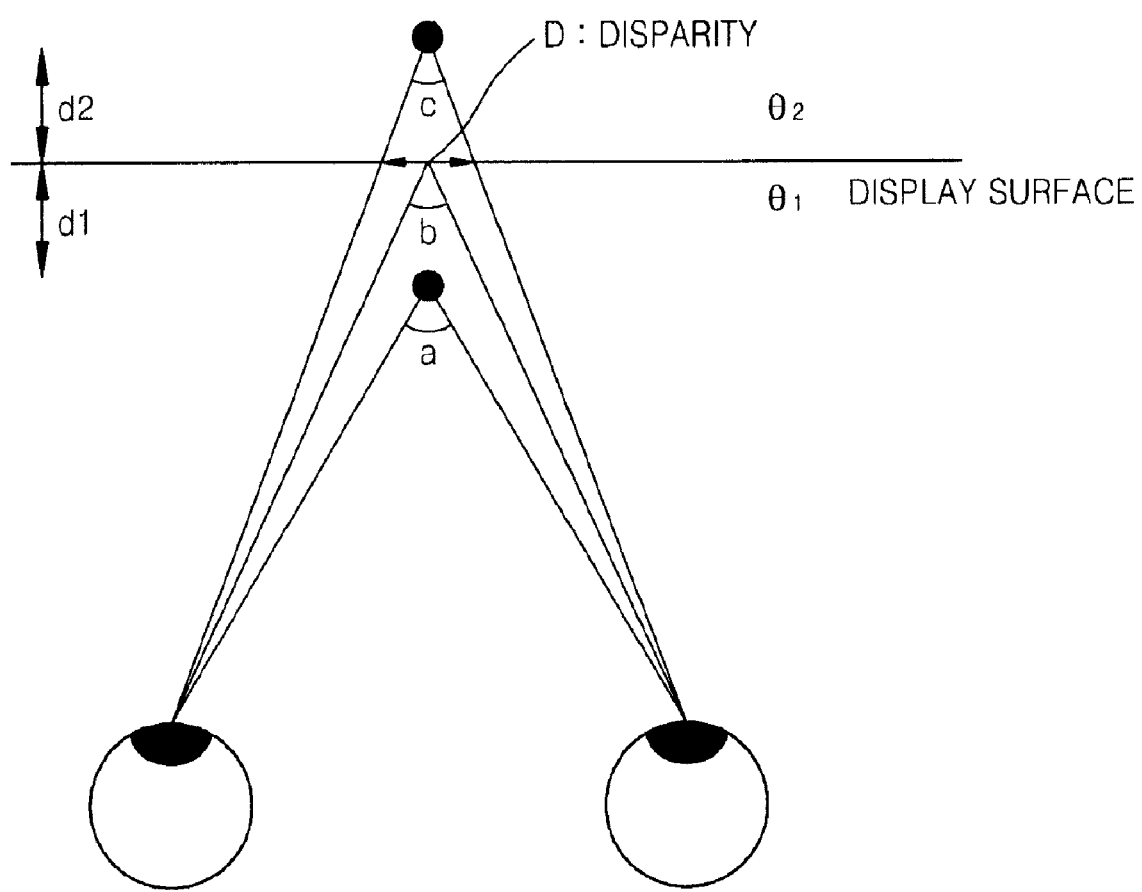
FIG. 10 is a diagram illustrating a method of obtaining parallax.

FIG. 10 is a diagram for describing a method of obtaining parallax $\theta_1$ and $\theta_2$.

FIG. 10 illustrates a concept for converting parallax $\theta_1$ and $\theta_2$ into a disparity D in a pixel unit. Referring to FIG. 10, the parallaxes $\theta_1$ and $\theta_2$ are a difference between a tuning angle b of the lens and a convergence angle of both eyes. $d_1$ and $d_2$ are ranges of depth in the parallaxes $\theta_1$ and $\theta_2$ that can feel a comfortable dynamic depth. These ranges can be obtained experimentally within the maximum parallax range $\pm 7°$, which is within a fusion range. When a viewing distance is given, $d_1 \sim d_2$ can be obtained using a second cosine rule, and the disparity D can be obtained using a proportional expression. In order to artificially control a depth to process an image signal, the disparity D should be calculated in a pixel unit. When the disparity D is divided into a pixel pitch as shown in Equation 1, the disparity D becomes the disparity D in a pixel unit in a digital image.

$$D_{pixel} = D/p \quad (1)$$

Here, p is a pixel pitch. As shown in Equation 1, $D_1 \sim D_2$, which is a range of $D_{pixel}$ corresponding to $d_1 \sim d_2$ can be obtained.

FIGS. 11A to 11F illustrate diagrams of various types of histogram functions.

Figure 11A:
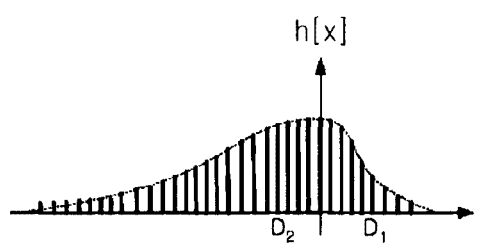
FIGS. 11A to 11F are diagrams illustrating various types of histogram functions.
Figure 11B:
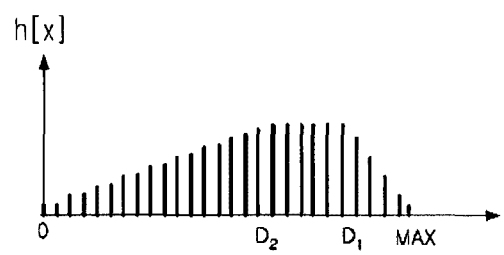
Figure 11C:
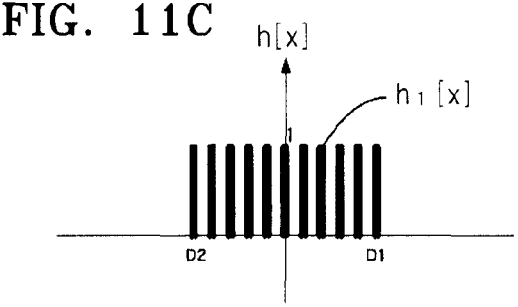
Figure 11D:
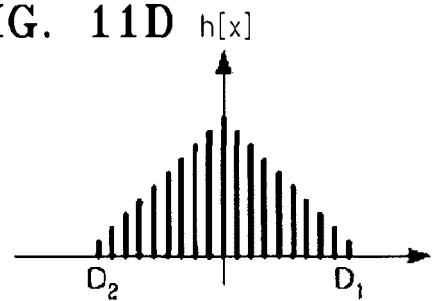
Figure 11E:
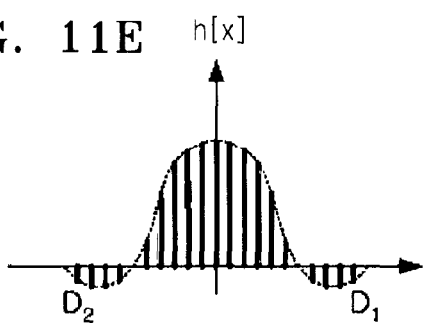
Figure 11F:
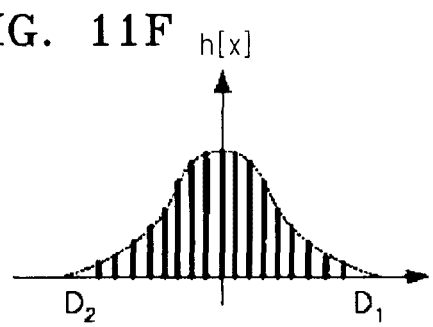

Diagrams in FIGS. 11A to 11F are those of various characteristic functions for performing a histogram convolution required in calculating a disparity control amount. Here, $D_1 \sim D_2$ is a disparity range of a pixel unit in the optimum depth range $d_1 \sim d_2$. FIGS. 11A and 11B illustrate nonsymmetrical functions that can be used as characteristic functions for a stereo-view image formed of a background and FIGS. 11C to 11F illustrate symmetrical functions that can be used as characteristic functions for a stereo-view image formed of a background and a foreground or an object.

Figure 12A:
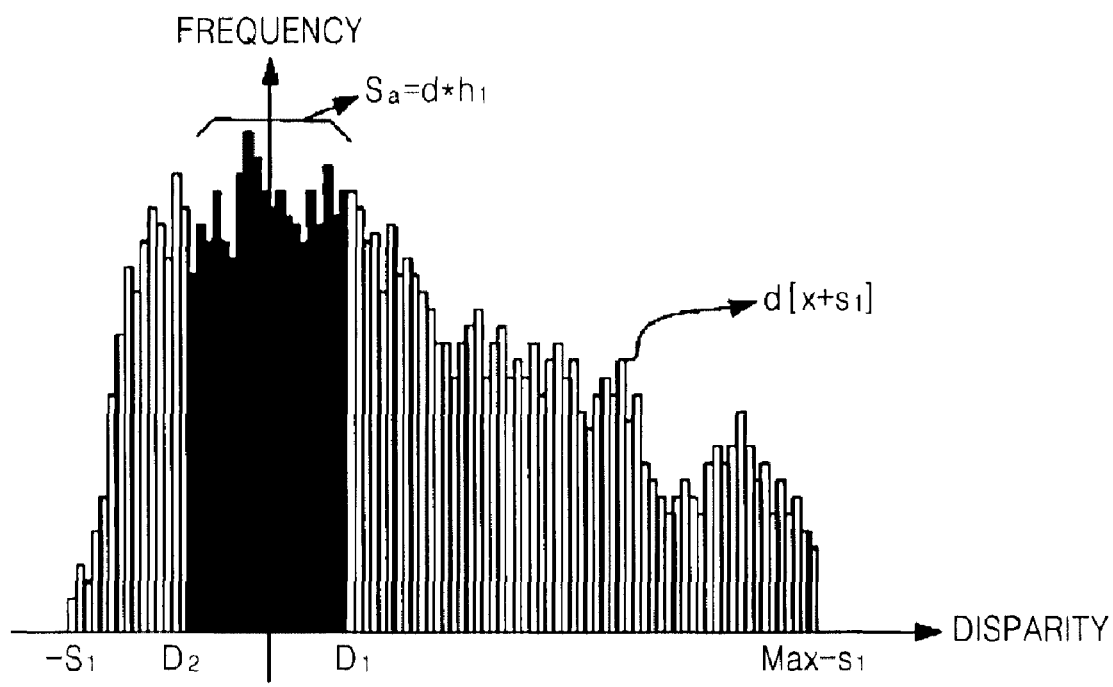
FIGS. 12A to 12C are diagrams illustrating processes of convoluting a disparity histogram and a characteristic function, and the results of the convoluting.
Figure 12B:
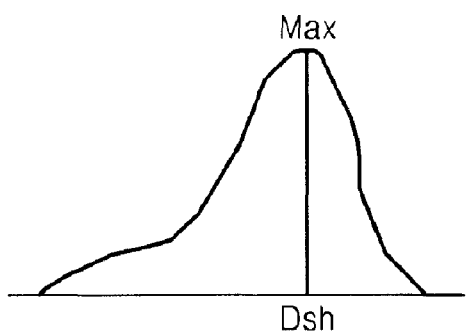
Figure 12C:
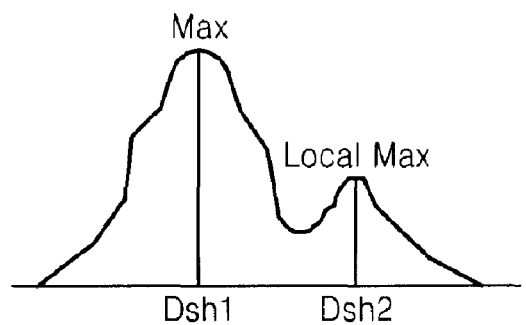

FIGS. 12A to 12C illustrate diagrams of processes of convoluting a disparity histogram and a characteristic function, and the results of convoluting.

FIG. 12A illustrates the result of convoluting the disparity histogram. $S_a$ is a discrete convolution sum when a disparity histogram d[x] is moved in a negative direction, and here, $S_1$ is distributed within a range of $$S_1 = -MAX, -MAX+1 \ldots 0, 1, 2, 3, \ldots, MAX. \quad (2)$$

$$S_a = d \times h_1 = \sum_{S_1=0}^{MAX} h_1[x]d[s_1 - x]$$

FIG. 12B is the result of convoluting a disparity histogram of a stereo-view image formed of a background, and has a parabolic form. Since a nonsymmetrical function having a weight on the right side is used, a disparity histogram moving amount $D_{sh}$ for determining the maximum value of $S_a$ is biased towards the right side. FIG. 12C is the result of convoluting a disparity histogram of a stereo-view image formed of a background and a foreground or an object. In FIG. 12C, since a symmetrical function is used, $S_a$ has two parabolic forms. In this case, $S_a$ determines the maximum value and a disparity histogram moving amount $D_{sh}$ having the local maximum value as a disparity control amount.

Referring back to FIG. 4, the image rearranger 408 rearranges an image using the disparity control amount calculated by the disparity control amount determiner 406 in order to display the image in a dynamic depth controlled to provide a comfortable audition. This will now be described in detail with reference to FIGS. 13A to 14B.

Figure 13A:
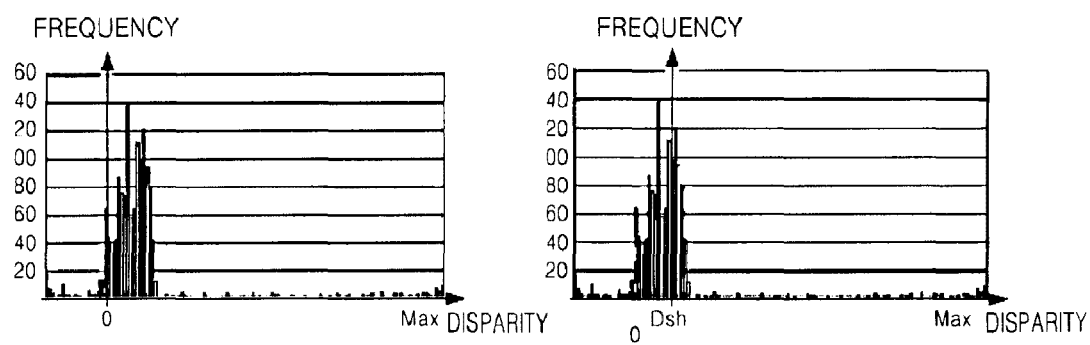
FIGS. 13A and 13B are diagrams illustrating a method of moving a disparity histogram according to a determined disparity control amount.
Figure 13B:
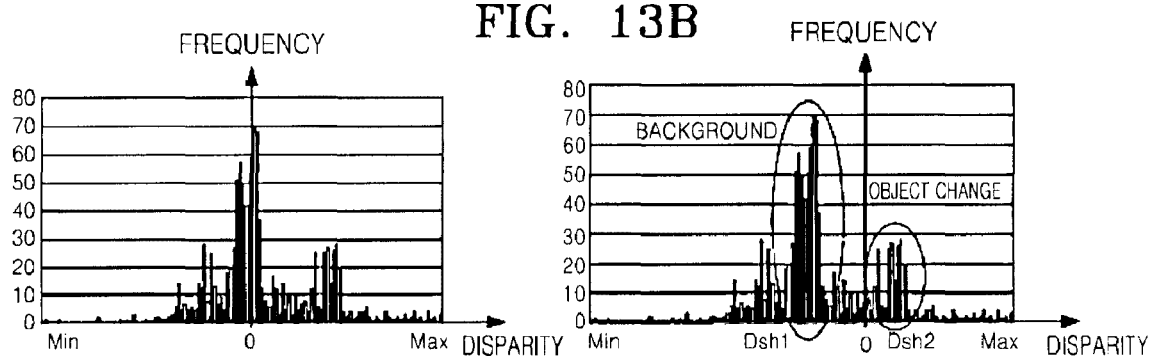

FIGS. 13A and 13B are diagrams of a method of moving a disparity histogram according to a determined disparity control amount.

FIG. 13A is a diagram illustrating when a stereo-view image is formed of a background. A disparity histogram is convoluted using a nonsymmetrical function. The disparity histogram is moved based on $D_{sh}$ obtained by the convolution, and thus a viewer can obtain comfortable dynamic depth by increasing a ratio of positive parallax (negative disparity).

FIG. 13B is a diagram illustrating when a stereo-view image is formed of a background and a foreground or an object. A disparity histogram is convoluted using a symmetrical function. The disparity histogram is moved based on $D_{sh2}$ instead of $D_{sh1}$, and thus a viewer can obtain a comfortable dynamic depth.

Figure 14A:
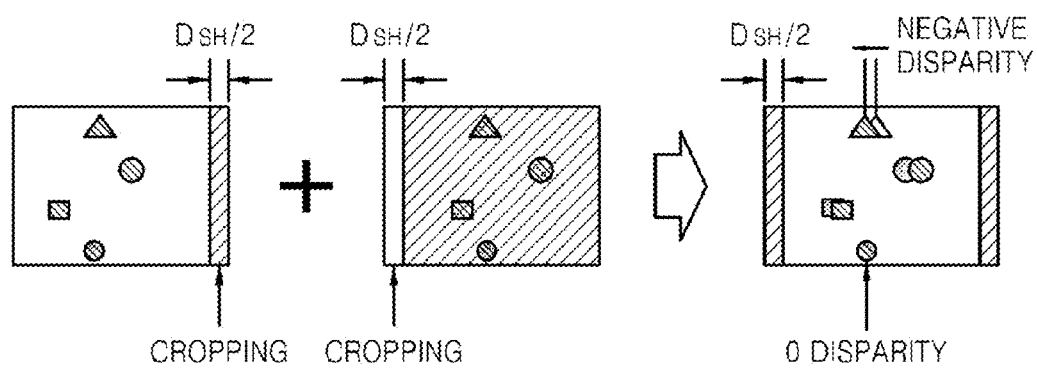
FIGS. 14A and 14B are diagrams illustrating a method of rearranging stereo-view or multi-view images according to a determined disparity control amount.
Figure 14B:
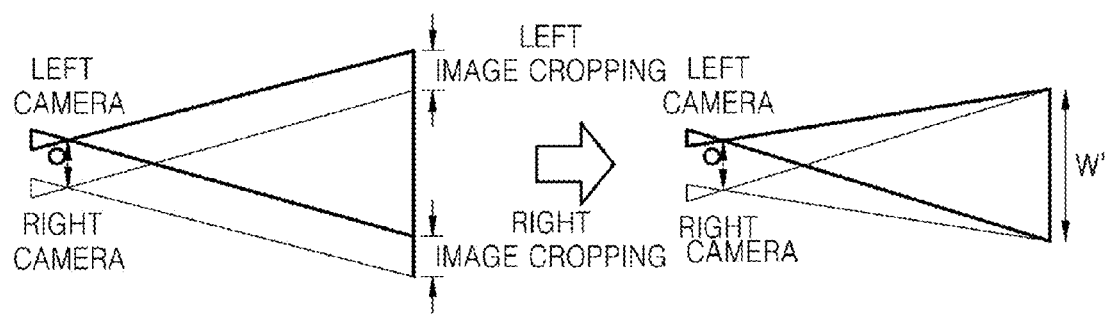

FIGS. 14A and 14B are diagrams of a method of rearranging stereo-view or multi-view images by moving a disparity histogram to a negative direction according to the determined disparity control amount $D_{sh}$.

The disparity histogram is moved by cutting off left and right ends of a stereo-view image by $D_{sh}/2$, which is half of a disparity control amount $D_{sh}$, as illustrated in FIG. 14A. By moving the disparity histogram, the parallax of the entire stereo-view image can be increased in a positive direction. The optimal depth can be provided to a viewer by analyzing the disparity histogram of the stereo-view image. Such an effect can be illustrated as shown in FIG. 14B in point of a stereoscopic camera, and a convergence point of a viewer's eyes can be controlled using a method of processing a signal in a receiver without using a hybrid stereoscopic camera illustrated in FIG. 2C.

Accordingly, a disparity control amount $D_{ah}(n)$ in each frame n is obtained, and the disparity control amount $D_{ah}(n)$ changes as content inside the stereo-view image changes. When a change amount $\Delta D_{sh}(n)$ suddenly increases or decreases in each frame interval, a jitter phenomenon, wherein the stereo-view image shakes minutely. Accordingly, although not illustrated in FIG. 4, a jitter prevention filter may be included in order to prevent the jitter phenomenon by applying and filtering a window in a uniform section. According to an exemplary embodiment of the present invention, a moving average filter is applied to the disparity control amount $D_{ah}(n)$ of stereo-view images sequentially inputted. When the size of a window is m, the moving average filter follows Equation 3.

$$D'_{sh}(n)=(D_{sh}(n)+D_{sh}(n-1)+D_{sh}(n-2)+\ldots+D_{sh}(n-m+1))/m \quad (3)$$

By applying $D'_{sh}(n)$ instead of $D_{ah}(n)$ to the image rearranger 408 of FIG. 4, the jitter phenomenon can be prevented.

Figure 15:
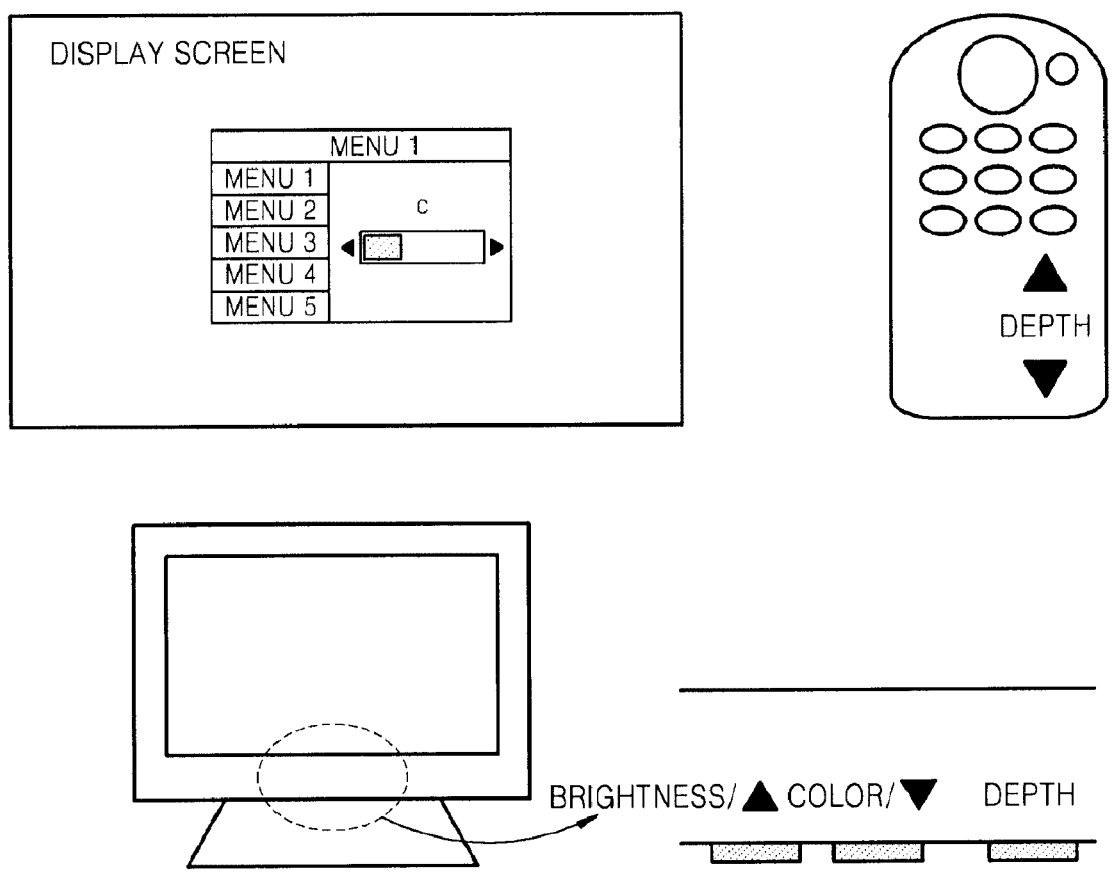
FIG. 15 is a diagram illustrating a method of controlling a dynamic depth via various user interfaces.

FIG. 15 is a diagram of a method of controlling a dynamic depth via various user interfaces.

According to another exemplary embodiment of the present invention, a user can control a dynamic depth of a stereo-view image by using a user interface which can control variables. The user interface may be an on screen display (OSD) interface or a remote control of a display. Displays, such as a DTV, a monitor, etc., control various variables, such as a contrast ratio, brightness, color, etc., via a user interface, such as an OSD interface. Like the variables can be conveniently controlled via an OSD menu by pressing a button on a remote control or a display, a menu, which can control a dynamic depth, on the OSD menu added to the user interface provides convenience to a viewer. Accordingly, a variable, i.e. parallax, for forming a dynamic depth received from a user interface is reflected on the disparity control amount determiner 406 of FIG. 4 in order to output an image desired by a viewer.

Figure 16:
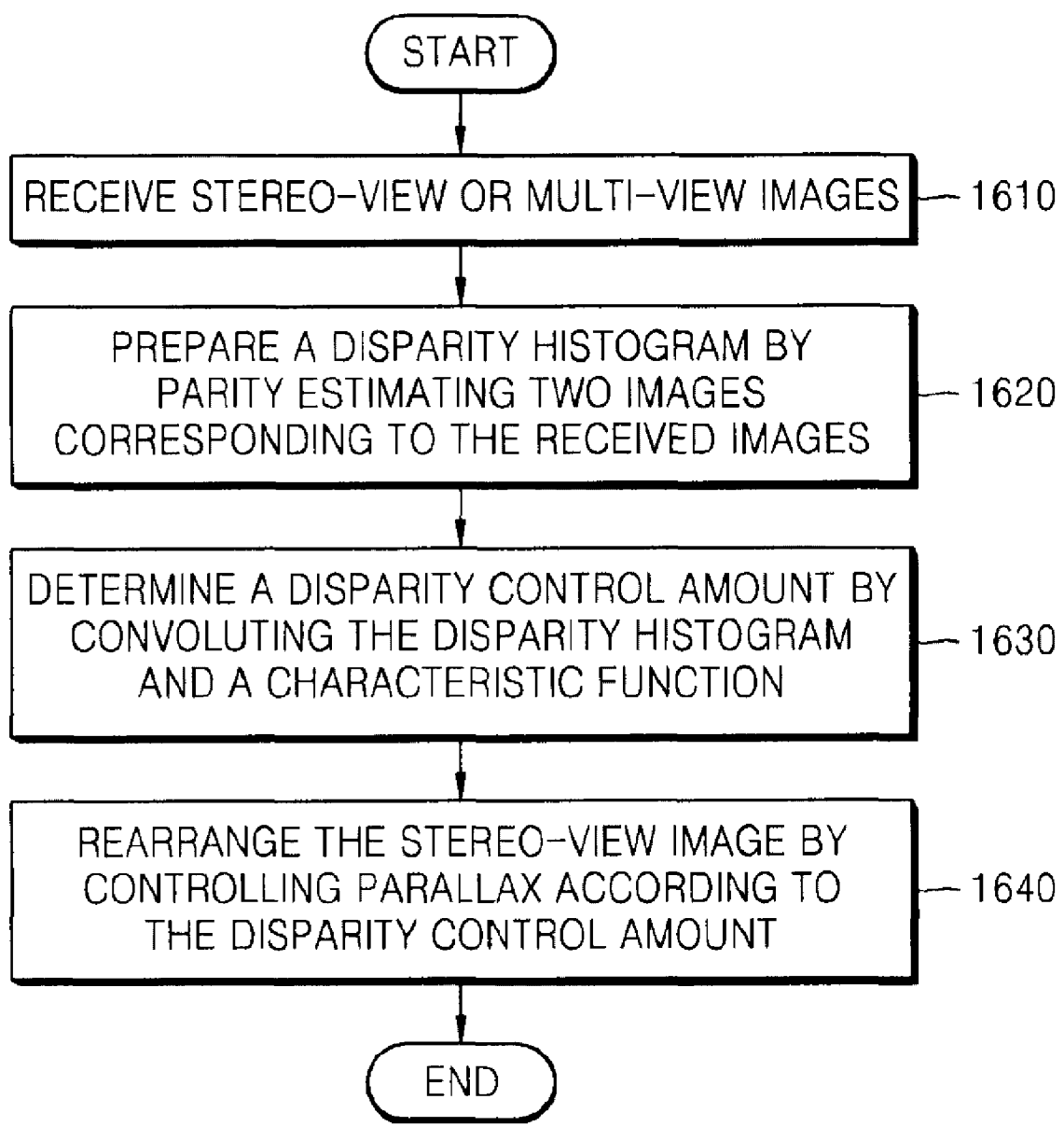
FIG. 16 is a flowchart illustrating a method of controlling a dynamic depth according to an exemplary embodiment of the present invention.

FIG. 16 is a flowchart of a method of controlling a dynamic depth, according to an exemplary embodiment of the present invention, performed in the apparatus for controlling a dynamic depth illustrated in FIG. 4.

In operation 1610, stereo-view or multi-view images are received.

In operation 1620, a disparity histogram is generated by estimating the disparity of two images corresponding to the received images and measuring frequency of the estimated disparity.

In operation 1630, a disparity control amount of the stereo-view or multi-view images is determined by convoluting the generated disparity histogram and a characteristic function.

In operation 1640, the stereo-view or multi-view images are rearranged by controlling parallax according to the disparity control amount.

According to the present invention, a method and apparatus for controlling a dynamic depth, which determines the optimum disparity control amount for minimizing side effects, such as eye fatigue, are provided while converting a stereo-view or multi-view image for a stereoscopic display. Using a method of processing a signal in a receiver, the stereoscopic content can have an effect of being photographed by a hybrid stereoscopic camera while photographing the stereoscopic content. The above process is realized by analyzing a disparity histogram of the stereo-view image in order to form the optimum 3D view and using a method of controlling disparity via a disparity histogram convolution sum technique. Moreover, a compressed stereo-view or multi-view image according to MPEG-2 MVP or MVC is decoded and then a disparity vector of each macroblock is extracted. Accordingly, a structure of a system can be formed simply and efficiently in a standardized compression and transmission environment.

Also according to the present invention, parallax can be controlled by using a user interface, which can set parallax desired by a user, in terms of displaying a rearranged stereo-view image.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a dynamic depth of stereo-view or multi-view images, the method comprising:
   receiving stereo-view or multi-view images;
   generating a disparity histogram by estimating a disparity of two images corresponding to the stereo-view or multi-view images which are received and measuring a frequency of the estimated disparity;
   determining a disparity control amount of the stereo-view or multi-view images by convoluting the generated disparity histogram and a characteristic function; and
   rearranging stereo-view or multi-view images by controlling parallax according to the disparity control amount.

2. The method of claim 1, wherein the generating the disparity histogram comprises determining whether the stereo-view or multi-view images which are received are encoded.

3. The method of claim 2, wherein, if it is determined that the stereo-view or multi-view images are encoded, the generating the disparity histogram comprises:
   extracting a disparity vector of a macroblock by decoding the stereo-view or multi-view images which are received; and
   generating the disparity histogram using a frequency of the disparity vector.

4. The method of claim 3, wherein the generating of the disparity histogram using the frequency of the disparity vector comprises:
   comparing a number of cases n when the macroblock is in a skip mode to an entire number N of macroblocks with a threshold value T set as an experiment value; and
   generating the disparity histogram using the frequency of the disparity vector if $$\frac{n}{N} < T,$$

and using a frequency of an estimated disparity of the macroblock if $$\frac{n}{N}$$

is not smaller than T.

5. The method of claim 2, wherein, if it is determined that the stereo view or multi-view images are not encoded, the generating the disparity histogram comprises generating the disparity histogram using a frequency of an estimated disparity of the macroblock.

6. The method of claim 1, wherein the characteristic function comprises one of a discrete characteristic function, a triangular function, a linear function, a quadratic function, a cubic function, and a nonsymmetrical function.

7. The method of claim 1, wherein the determining the disparity control amount comprises:
   using a nonsymmetrical function having a weight on a right side as the characteristic function if the received images are background images;
   obtaining a movement amount when the nonsymmetrical function has a right peak value of an output value, via a convolution using the nonsymmetrical function; and determining a value obtained by converting the movement amount to a pixel unit as the disparity control amount.

8. The method of claim 1, wherein the determining the disparity control amount comprises:
   using a symmetrical function as the characteristic function if the stereo-view or multi-view images comprise objects and backgrounds;
   obtaining a movement amount if the symmetrical function has a maximum value of an output value, via a convolution using the symmetrical function; and
   determining a value obtained by converting the movement amount to a pixel unit as the disparity control amount.

9. The method of claim 1, wherein in the determining the disparity control amount, a value obtained by converting parallax within ±7° to a pixel unit is a range of the characteristic function.

10. The method of claim 1, wherein the rearranging of the stereo-view or multi-view input images comprises controlling the parallax by horizontally moving the stereo-view or multi-view images by a value corresponding to half of the disparity control amount.

11. The method of claim 1, wherein the rearranging of the stereo-view or multi-view input images comprises one of:
   maintaining the stereo-view or multi-view images so as to have a same size of an input image; and
   adjusting the stereo-view or multi-view images to a display form by cutting off boundaries of each of the stereo-view or multi-view images by a value corresponding to half of the disparity control amount.

12. The method of claim 1, further comprising performing moving average filtering in order to prevent a jitter phenomenon.

13. An apparatus for controlling a dynamic depth of stereo-view or multi-view images, the apparatus comprising:
   a receiver which receives stereo-view or multi-view images;
   a disparity estimator which generates a disparity histogram by estimating a disparity of two images corresponding to the stereo-view or multi-view images and measuring a frequency of the estimated disparity;
   a disparity control amount determiner which determines a disparity control amount of the stereo-view or multi-view images by convoluting the generated disparity histogram and a characteristic function; and
   an image rearranger which rearranges stereo-view or multi-view input images by controlling parallax according to the disparity control amount.

14. The apparatus of claim 13, wherein the disparity estimator comprises a decoding determiner which determines whether the stereo-view or multi-view images are encoded.

15. The apparatus of claim 14, wherein, if it is determined that the stereo-view or multi-view images are encoded, the disparity estimator extracts a disparity vector of a macroblock by decoding the stereo-view or multi-view images and generates the disparity histogram using the frequency of the disparity vector.

16. The apparatus of claim 15, wherein the disparity estimator compares a number of cases n when the macroblock is in a skip mode to an entire number N of the macroblocks with a threshold value T set as an experimental value and generates the disparity histogram using the frequency of the disparity vector if $$\frac{n}{N} < T,$$

and using a frequency of an estimated disparity of the macroblock if $$\frac{n}{N}$$

is not smaller than T.

17. The apparatus of claim 14, wherein, if it is determined that the stereo-view and multi-view images are not encoded, the disparity estimator generates the disparity histogram using a frequency of an estimated disparity of a macroblock.

18. The apparatus of claim 13, wherein the characteristic function comprises one of a discrete characteristic function, a triangular function, a linear function, a quadratic function, a cubic function, and a nonsymmetrical function.

19. The apparatus of claim 13, wherein the disparity control amount determiner uses a nonsymmetrical function having a weight on a right side as the characteristic function if the stereo-view and multi-view images are background images, obtains a movement amount if the nonsymmetrical function has a right peak value of an output value, via a convolution using the nonsymmetrical function, and determines a value obtained by converting the movement amount to a pixel unit as the disparity control amount.

20. The apparatus of claim 13, wherein the disparity control amount determiner uses a symmetrical function as the characteristic function if the stereo-view and multi-view images comprise objects and backgrounds, obtains a movement amount if the symmetrical function has the maximum value of an output value, via a convolution using the symmetrical function, and determines a value obtained by converting the movement amount to a pixel unit as the disparity control amount.

21. The apparatus of claim 13, wherein the disparity control amount determiner has a value obtained by converting parallax within ±7° to a pixel unit as a range of the characteristic function.

22. The apparatus of claim 13, wherein the image rearranger controls the parallax by horizontally moving the stereo-view or multi-view images by a value corresponding to half of the disparity control amount.

23. The apparatus of claim 13, wherein the image rearranger performs one of maintaining the stereo-view multi-view images so as to have the same size of an input image, and adjusting the stereo-view multi-view images to a display form by cutting off boundaries of each of the stereo-view or multi-view images by a value corresponding to half of the disparity control amount.

24. The apparatus of claim 13, further comprising a jitter remover which performs moving average filtering in order to prevent a jitter phenomenon.

25. The apparatus of claim 13, further comprising a user interface which can control the dynamic depth by receiving at least one of a range of parallax and the disparity control amount via a user input signal.

* * * * *